Patented Feb. 5, 1929.

1,701,264

UNITED STATES PATENT OFFICE.

WILHELM HIRSCHKIND, OF PITTSBURG, CALIFORNIA, ASSIGNOR TO GREAT WESTERN ELECTRO-CHEMICAL COMPANY, A CORPORATION OF CALIFORNIA.

PROCESS OF MANUFACTURING SODIUM XANTHATE.

No Drawing.   Application filed November 28, 1924. Serial No. 752,807.

This invention relates to a process for the manufacture of sodium xanthate. The process is herein described as applied to the manufacture of sodium xanthate, with the concomitant but separate production of potassium xanthate. As thus operated there may be obtained a total yield of xanthate equal to over 80% of that theoretically possible instead of the customary yield of about 60%. In my copending application Serial No. 752,806 a similar process is disclosed for the production of potassium xanthate exclusively.

Methods of producing xanthate are well known, as by adding carbon disulphide to a solution of a caustic alkali in an alcohol, the result of which is the precipitation of crystals of the alkali xanthate in a mother liquor. This yields available commercial xanthate crystals, where potassium or sodium hydroxide has been used, of about 60% to 70% of the theoretically possible yield of xanthate. The xanthate crystals thus produced are normally soluble, i. e., they are readily soluble in water.

Another known method is to dissolve the caustic alkali in water and mix this aqueous solution with a smaller amount of alcohol and carbon disulphide. This reduces the amount of alcohol needed, but also leaves about the same proportion of the theoretically possible yield of xanthate in the mother liquor. The xanthate crystals thus produced are also normally soluble.

According to the present invention sodium xanthate may be made by the latter method, with the production of a crystalline salt having the formula $CSOC_2H_5SNa.2H_2O$, where ethyl alcohol is used. These crystals, which contain two molecules of water, melt in their water of crystallization at about 60° C., and may be converted into the anhydrous salt by drying in vacuum below 60° C.

In one run, according to the present invention, 357 pounds of denatured 91% ethyl alcohol were added to a kettle in which were 605 pounds of caustic soda solution containing 46% sodium hydroxide. The agitator of the kettle kept the materials thoroughly mixed, and the mixture was cooled to 25° C. by the water jacket of the kettle. The kettle was closed with a reflux condenser. Then 563 pounds carbon disulphide were added at such a rate, with the aid of the water jacket and the agitator, that the temperature did not rise above 30° C.

The final semi-solid mass was run into a centrifuge and the mother liquor separated. After further drying there were obtained 800 pounds of crystals having the formula

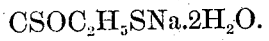
$$CSOC_2H_5SNa.2H_2O.$$

The mother liquor remaining, which was about 725 pounds, was mixed with 300 pounds of caustic potash solution containing 55% of caustic potash in a kettle kept cool by a water jacket and agitator. The resulting mass was centifuged and there were obtained, after further drying, 300 pounds of normally soluble potassium xanthate.

The 55% solution of caustic potash used is about the maximum strength that can be handled commercially. The presence of impurities somewhat reduces the solubility of the caustic potash, and if an absolutely saturated solution were used, crystallization in tanks and pipe lines would be likely to interfere with the practical manipulation of the process.

The 46% solution of caustic soda is convenient because it is a strength commercially shipped. A 49% solution might be preferable if the solution is especially made up.

The final mother liquor is a valuable auxiliary to mineral-frothing agents in the froth-flotation concentration of ores, especially for use in alkaline pulps. It often contains about 16% of caustic alkali.

Similar procedures with methyl, butyl and amyl alcohols in place of the ethyl alcohol yielded corresponding results, the proportion of xanthate recovered varying generally with the solubility of the xanthate.

Having thus described certain embodiments of my invention what I claim is:

1. The process of obtaining xanthate in the form of a separable precipitate which consists in causing an alcohol, caustic soda and carbon disulphide to react to produce and precipitate normally-soluble sodium xanthate, and adding caustic potash to the mother liquor to precipitate a further quantity of normally-soluble xanthate.

2. The process of obtaining xanthates in the form of a separable precipitate which consists in causing ethyl alcohol to react with caustic soda solution and carbon disulphide to produce and precipitate normally-soluble sodium xanthate, and adding caustic potash to the mother liquor to precipitate normally soluble potassium xanthate.

In testimony whereof, I have affixed my signature to this specification.

WILHELM HIRSCHKIND.